Feb. 9, 1960 L. J. KOCH ET AL 2,924,483
FUEL HANDLING MECHANISM
Filed March 19, 1957 6 Sheets-Sheet 1

INVENTORS
Leonard J. Koch
Ernest Hutter
BY
Roland A. Anderson
Attorney

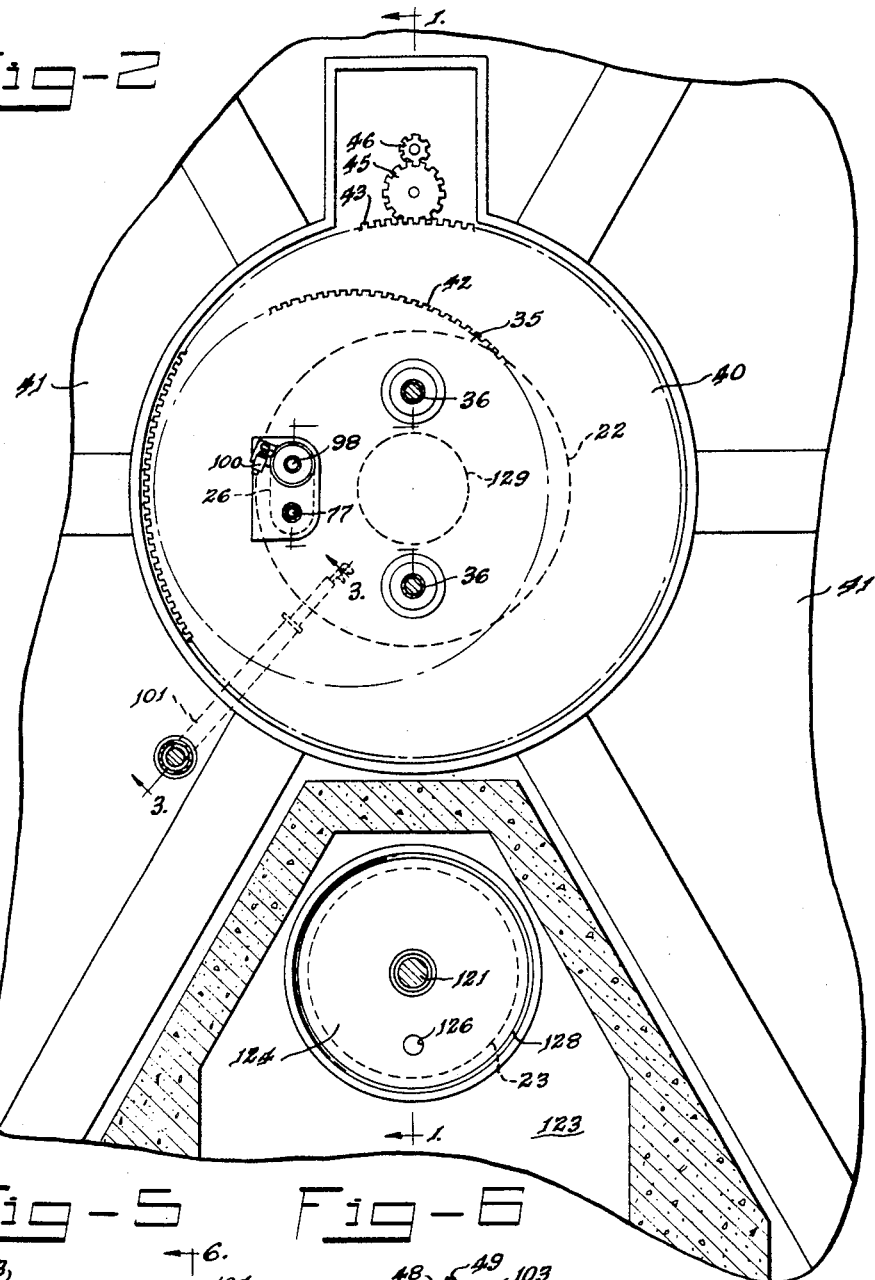
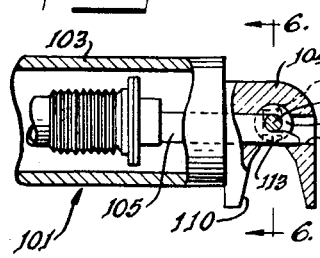
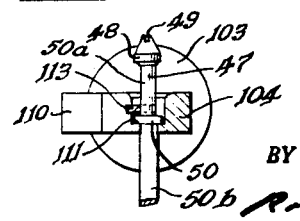

Feb. 9, 1960   L. J. KOCH ET AL   2,924,483
FUEL HANDLING MECHANISM
Filed March 19, 1957   6 Sheets-Sheet 3
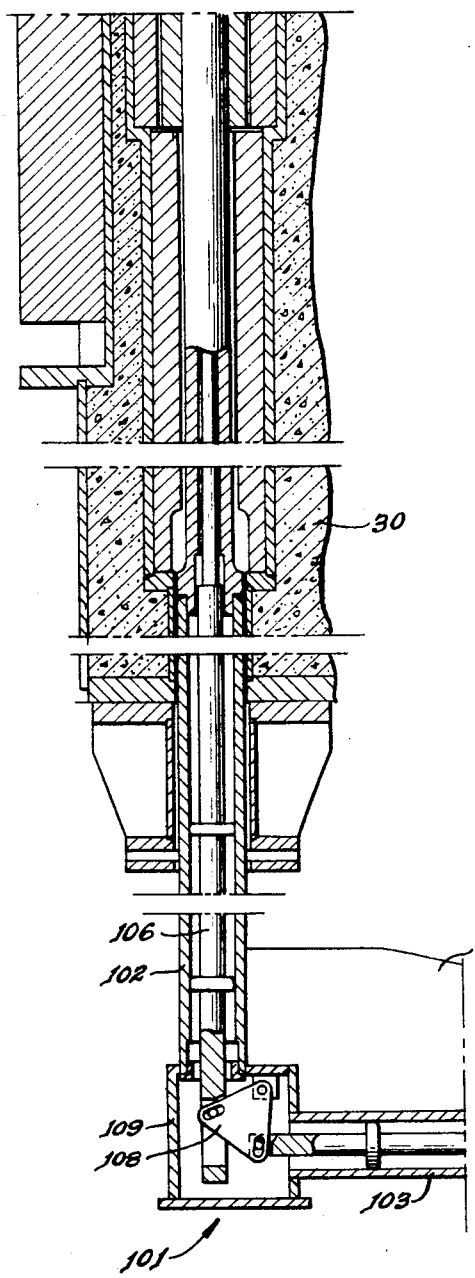
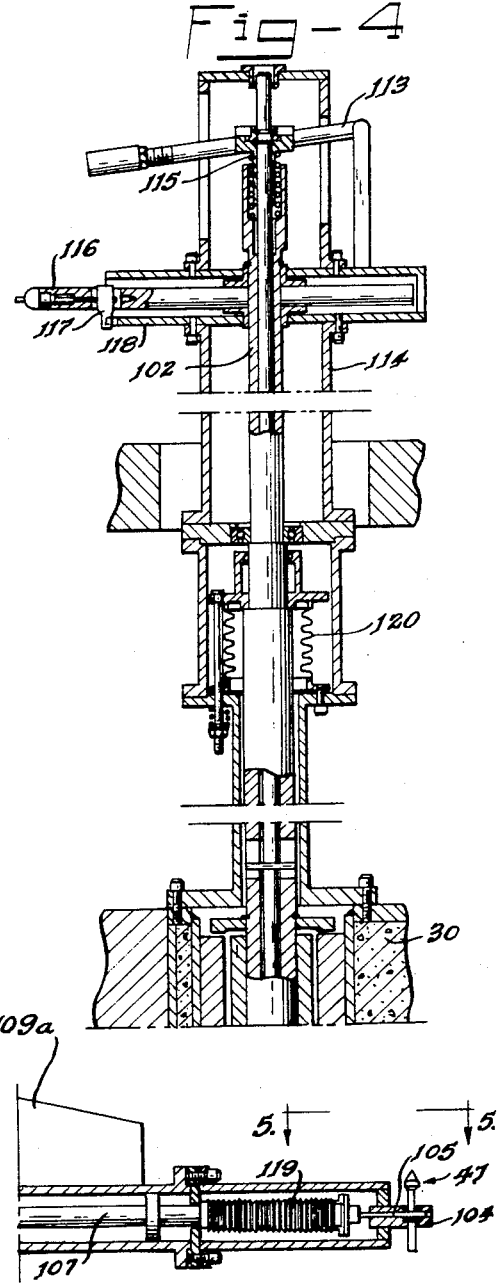
INVENTORS
Leonard J. Koch
Ernest Hutter
BY
Roland A. Anderson
Attorney Feb. 9, 1960
L. J. KOCH ET AL
2,924,483
FUEL HANDLING MECHANISM
Filed March 19, 1957
6 Sheets-Sheet 4
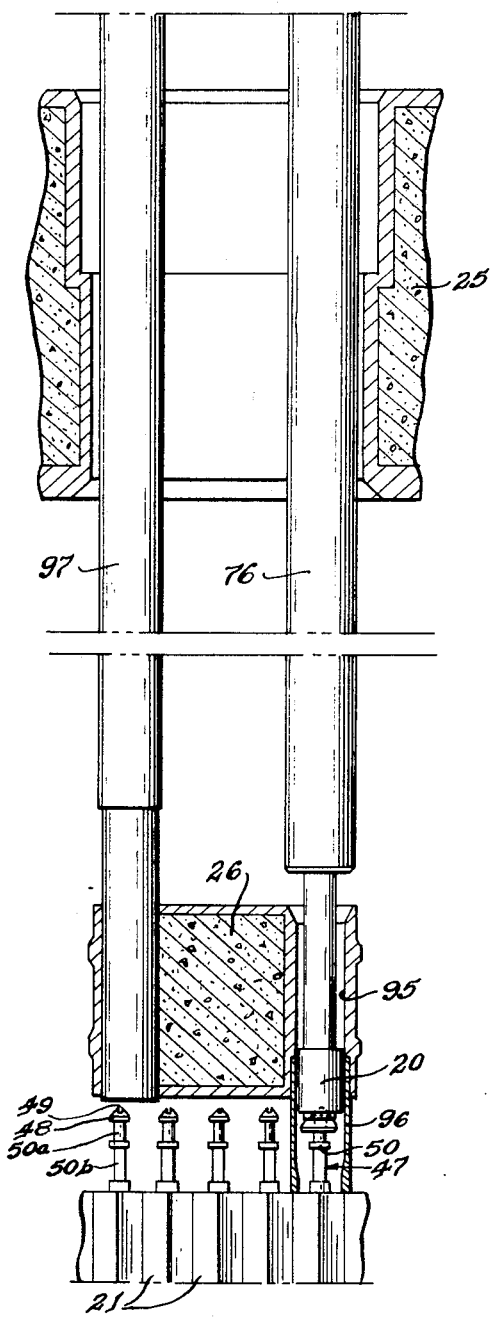
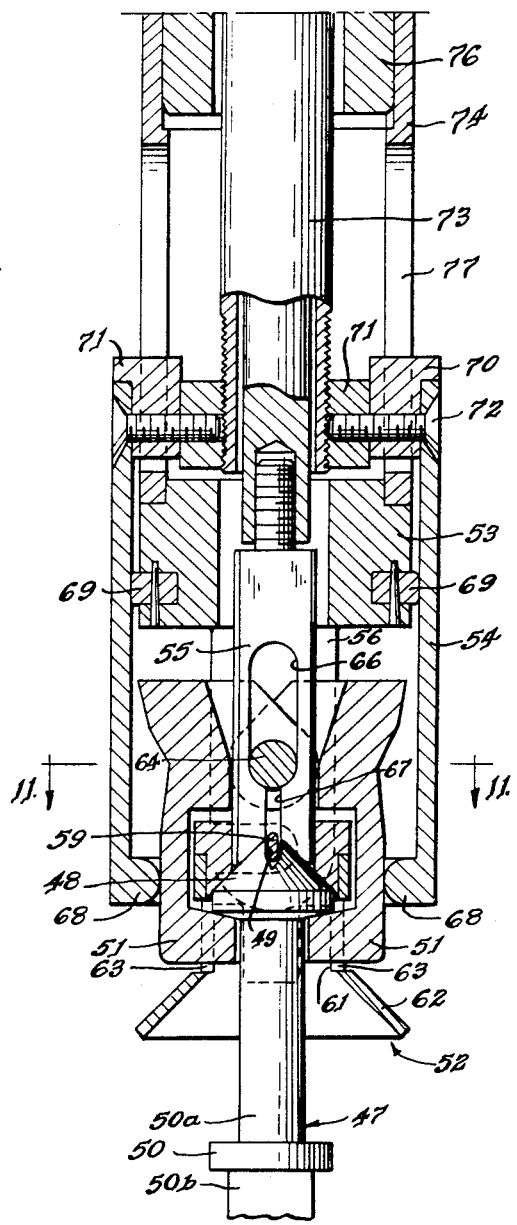
INVENTORS
Leonard J. Koch
BY Ernest Hutter
Attorney

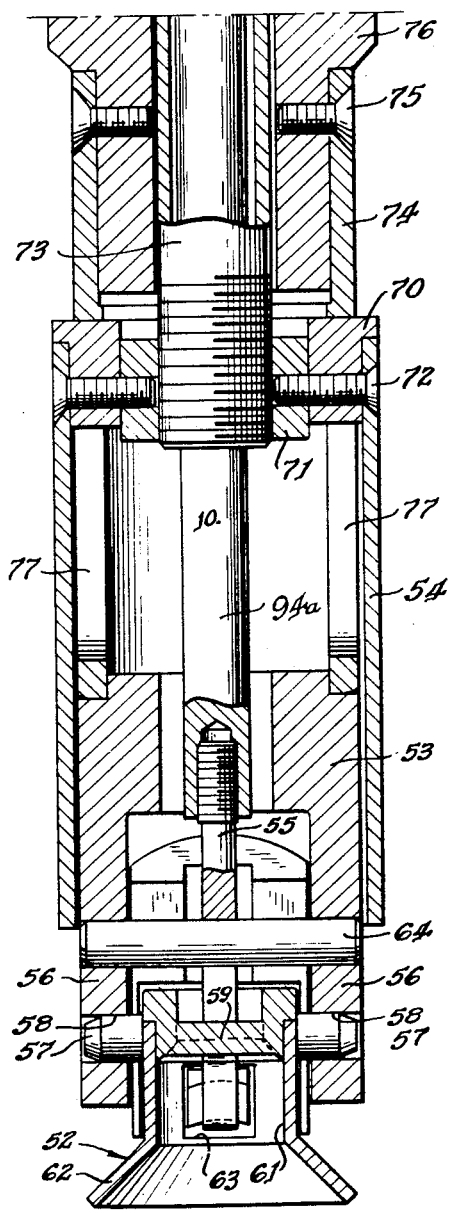
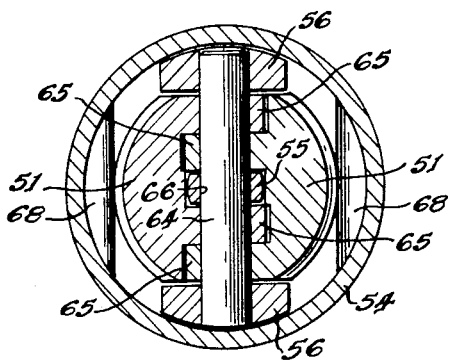
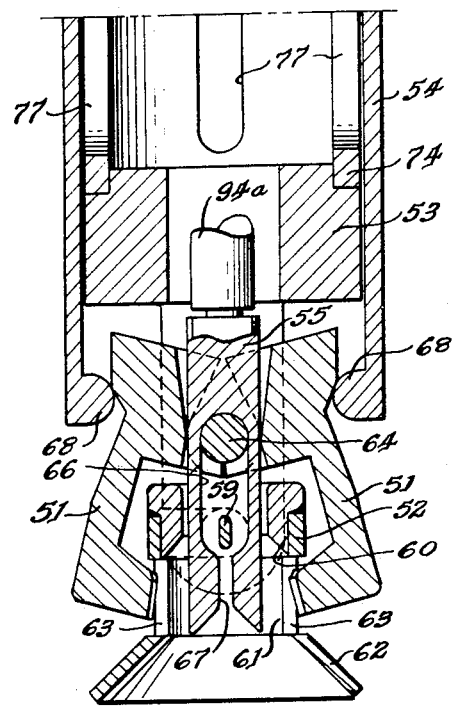

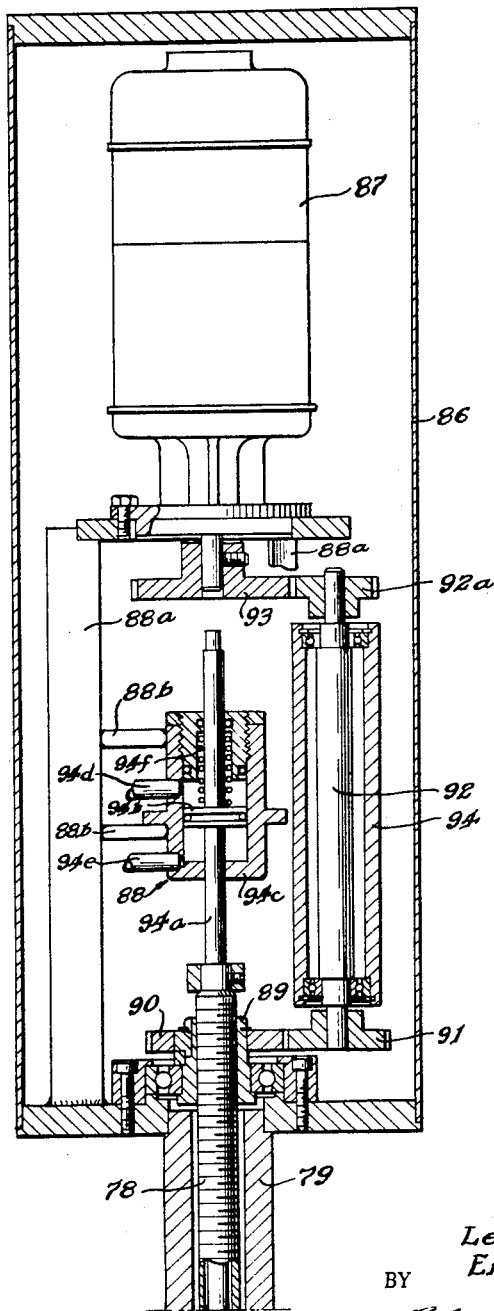

United States Patent Office 2,924,483
Patented Feb. 9, 1960

2,924,483

FUEL HANDLING MECHANISM

Leonard J. Koch, Clarendon Hills, and Ernest Hutter, Chicago, Ill., assignors to the United States of America as represented by the United States Atomic Energy Commission Application March 19, 1957, Serial No. 647,173

3 Claims. (Cl. 294—86)

This invention relates to a gripping mechanism and, more specifically, to a mechanism of this type adapted for the removal and replacement of rod-like elements by remote operation.

In the removal and replacement of used fuels rods in a nuclear reactor, it is important to exercise care in the gripping and release of such rods, because these operations are carried out by remote control and jamming of the rods in the gripping mechanism is difficult to remedy. Such jamming occurs if there is misalignment of the gripping mechanism and the ends of the fuel rods to be gripped thereby.

The gripping mechanism of the present invention is constructed to insure gripping and release of rods in spite of misalignment between the rods and the mechanism.

In the drawings:

Fig. 2 is a horizontal sectional view taken on the line 2—2 of Fig. 1;

Fig. 3 is a vertical sectional view taken on the line 3—3 of Fig. 2 and showing the lower portion of a transfer mechanism for moving fuel rods from the reactor core to the storage tank;

Fig. 4 is a vertical sectional view of the upper portion of the transfer mechanism, the complete transfer mechanism being viewable by positioning of Fig. 4 directly above Fig. 3;

Fig. 5 is a horizontal sectional view taken on the line 5—5 of Fig. 3 and showing one end of the transfer mechanism;

Fig. 6 is a vertical sectional view taken on the line 6—6 of Fig. 5;

Fig. 7 is a fragmentary vertical sectional view of a hold-down mechanism employed in conjunction with the gripping mechanism;

Fig. 8 is a vertical sectional view of the gripping mechanism of the present invention;

Fig. 9 is a vertical sectional view rotated 90° from Fig. 8 and showing the parts of the gripping mechanism in a different position from that of Fig. 8;

Fig. 10 is a vertical sectional view taken on the line 10—10 of Fig. 9;

Fig. 11 is a horizontal sectional view taken on the line 11—11 of Fig. 8; and

Fig. 12 is a sectional view taken on the line 12—12 of Fig. 1 and showing the means for manipulating and shifting the gripping mechanism.

Figure 1:
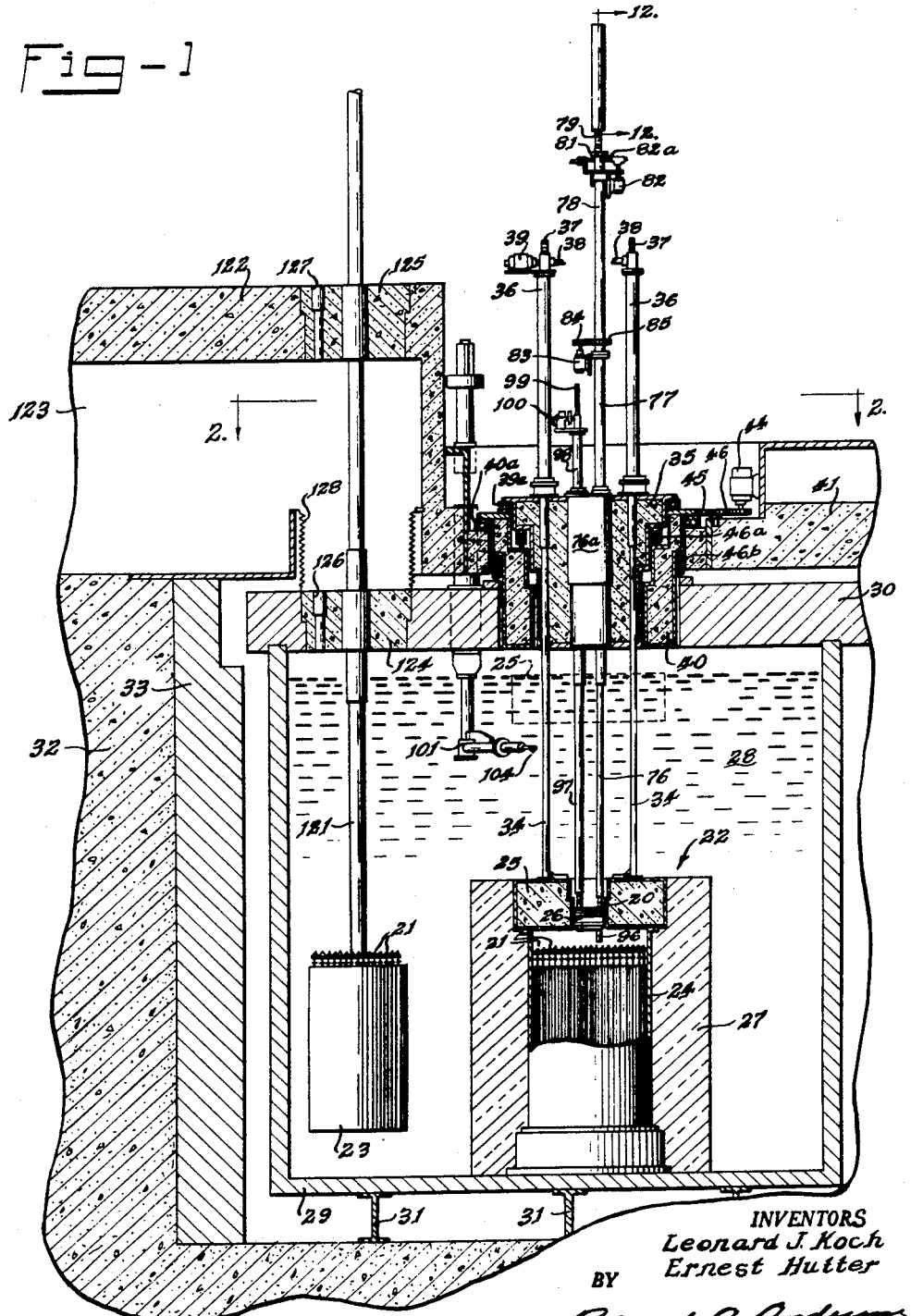
Fig. 1 is a vertical sectional view taken on the line 1—1 of Fig. 2 and showing apparatus for shifting fuel rods from a nuclear reactor to a storage tank at one side of the reactor.

As shown in Figs. 1 and 7, a gripping mechanism 20 of the present invention aids in the transfer of used fuel elements 21 from a nuclear reactor 22 to a storage container 23. The nuclear reactor 22 comprises, in addition to the fuel elements 21 therein, a tank 24 containing the same, a cover 25 on the open upper end of the tank, and a plug 26 which closes an opening in the cover 25 and is associated with the gripping mechanism 20.

The tank 24 is encased in a shield 27 which has a reflector portion. The cover 25 and plug 26, are filled with shielding material. The reactor 22 and storage container 23 are submerged in a body 28 of liquid coolant, preferably sodium, which is also pumped into and out of the tank 24 so as to flow over the fuel elements 21 for cooling the same. For example, the liquid coolant may flow upwardly over a central group of fuel elements and downwardly over the other fuel elements. The coolant may be pumped by a pump of the electromagnetic type positioned in the body 28 of coolant. The coolant being pumped may be cooled by a heat exchanger positioned in the body 28 of coolant. Neither the pump, the pumping lines, nor the heat exchanger is shown, since these parts form, per se, no part of the present invention.

The fuel elements 21 may be of the types disclosed in the Hurwitz et al. application Serial No. 236,644, filed July 13, 1951, now Patent No. 2,799,642, issued July 16, 1957. Some of the outer elements may be blanket rods, rather than true fuel rods. The important thing is that the elements 21 be supported in a vertical position and be shaped at their upper ends to be capable of being engaged for lifting by the gripping mechanism 20, as will be more fully described presently.

The body 28 of coolant is contained in a tank 29 which is closed at its top by a slab 30 and is supported on a plurality of I-beams 31 resting in a biological shield 32. The tank 29 is surrounded by a blast shield 33, which is embedded in and surrounded by the biological shield 32.

The cover 25 is carried by a pair of rods 34, which shift it between the full-line position of Fig. 1 in which it closes the tank 24 and the dotted-line position of Fig. 1 in which it is held adjacent the slab 30 so as to permit movement of the fuel elements 21 from the reactor 22 to the storage container 23. The rods 34 are connected at their lower ends to the cover 25 and project upwardly through an inner circular plug 35 and through sleeves 36. The upper ends of the rods 34 have threaded portions 37 which engage nuts (not shown) through balls (not shown). The nuts are rotated through gears (not shown) by a shaft 38 driven by a motor 39. All these parts are carried by the upper ends of the sleeves 36 which are secured at their lower ends to the inner circular plug 35.

This plug is rotatably mounted by a bearing 39a in an outer rotatable circular plug 40 in an opening therein that is eccentric thereto. The outer plug 40 is rotatably mounted by a bearing 40a in an opening in a top biological shield 41 which lies just above the slab 30. The plugs 35 and 40 extend through an opening in the slab 30. As shown in Fig. 2, the plugs 35 and 40 carry gears 42 and 43, respectively, by which they are rotated. The gear 43 is driven by a motor 44 through gears 45 and 46. The driving means for the gear 42 is not shown. A seal 46a acts between the plugs 35 and 40, and a seal 46b between the plug 40 and the shield 41.

It is contemplated that the fuel elements 21 will have a hexagonal outline throughout the greater portions of their lengths so as to fit together tightly. As shown in Figs. 7 and 8, each fuel element has at its upper end a rod 47 which has an enlarged conical head 48 provided with a transverse slot 49 and an enlarged round collar or shoulder 50 spaced from the head 48 and from the main or body portion of the fuel element. A region 50a of the rod 47 above the collar 50 is circular in cross section, and a region 50b below the collar is oblong in cross section.

The novel gripping mechanism 20 comprises a pair of pivoted jaws 51 for engaging the underside of the head 48, a cage 52 for guiding the head 48, a collar 53 supporting the jaws 51 and cage 52, a release member 54 for the jaws 51, and a sensing element 55 for detecting the presence of the fuel-element head 48 in the gripping mechanism 20.

As shown in Fig. 9, the collar 53 has depending ears 56, near the lower ends of which the cage 52 is secured by means of projections 57 thereon extending into openings 58 in the ears 56 and secured against rotation thereto. The cage 52 has at the level of the projections 57 an internal transverse locating element 59 which is adapted to engage the slot 49 in the fuel-element head 48. The cage 52 also has at the level of the locating element 59 an internal conical surface 60 engageable with the head 48, an internal cylindrical surface 61, and a conical skirt 62. The cage 52 has at the region of the cylindrical surface 61 opposed slots 63 through which the ends of the jaws 51 can project to engage the head 48.

The jaws 51 are pivotally supported on the ears 56 of the collar 53 by means of a pin 64 which extends into the ears 56 above the cage 52. As shown in Fig. 11, each jaw has spaced portions 65 with which the sensing element 55 and the portions 65 of the other jaw 51 fit between the ears 56 of the collar 53 so that the jaws 51 are held against movement along the pin 64. Downward movement of the sensing element 55 is limited to the position of Fig. 10 by engagement of the pin 64 with the upper end of a relatively wide slot 66 in the sensing element 55. Upward movement of the sensing element 55 is limited to the position of Fig. 8 by engagement of the pin 64 with the lower end of the relatively wide slot 66, which opens into a relatively narrow slot 67 which is narrower than the relatively wide slot 65 but is of a size to pass the locating element 59 of the cage 52. The narrow slot 67 has an open flaring lower end so that the sensing element 55 is enabled to engage the conical head 48 of the fuel element 21 in the manner shown in Fig. 8.

The release member 54 takes the form of a tubular section having at its lower end opposed internal protrusions 68 which either engage the lower portions of the jaws 51 as shown in Fig. 8 to hold the jaws in engagement with the fuel-element head 48 or engage the upper portions of the jaws 51 as shown in Fig. 10 to release the jaws from the fuel-element head. The member 54 rides on wear shoes 69 attached to the collar 53. The member 54 is attached by pieces 70, a threaded collar 71 and screws 72 to the lower end of an internal tube 73. The collar 53 is attached by a sleeve 74 and screws 75 to the lower end of an external tube 76. The sleeve 74 has two sets of opposed elongated slots 77 which receive the pieces 70 attached to the release member 54, whereby rotation of the release member 54 with respect to the collar 53 is prevented and the internal protrusions 68 are held angularly in position to engage the jaws 51.

As shown in Fig. 1, the external tube 76 projects upwardly through a generally elliptical plug 76a, a fixed sleeve 77 secured to the top thereof, and a rotatable sleeve 78 journaled on and projecting above the fixed sleeve 77. Above the rotatable sleeve 78 the external tube 76 has a threaded section 79, which engages a nut 81 which is journaled on the upper end of the sleeve 78 and is rotated by a motor 82. The motor, which has a vertical shaft (not shown), is drivingly connected with the nut 81 through a horizontal shaft 82a, bevel gears (not shown) between the horizontal shaft and the vertical motor shaft, and a worm gear (not shown) meshing with one another and secured to the horizontal shaft 82a and the nut 81, respectively. The external tube 76 is held against rotation with respect to the rotatable sleeve 78, so that, when the nut 81 is rotated, the external tube 76 is shifted longitudinally with respect to the sleeve 78 and the gripping mechanism 20 moves up or down. The plug 76a is mounted in the inner plug 35. The rotatable sleeve 78 is rotated with respect to the fixed sleeve 77 by means of a motor 83 acting through a gear 84 driven thereby and a gear 85 meshing with the gear 84 and fixed to the rotatable sleeve 78. The motor 83 is supported by the fixed sleeve 77.

As shown in Fig. 12, there is shown, affixed to the threaded section 79 constituting the upper end of the external tube 76, a casing 86 which houses and mounts a motor 87 for the internal tube 73 and a hydraulic actuator 88 for the sensing element 55 (Figs. 9 and 10). The motor 87 is carried by three posts 88a (two being shown in Fig. 12) secured to the base of the casing 86. The actuator 88 is carried by straps 88b secured to one of the posts 88a. The upper end of the internal tube 73 is threaded and projects into the casing 86, where it is journaled and engages a nut 89, to which a gear 90 is secured. The gear 90 meshes with a gear 91 secured to a shaft 92 to which is also secured a gear 92a meshing with a gear 93 directly driven by the motor 87. The shaft 92 is journaled in a tubular housing 94, which is carried by and within the casing 86. The motor 87, acting through the gears 90, 91, 92a and 93, and the shaft 92, rotates the nut 89. The internal tube 73, being held against rotation with respect to the external tube 76, is moved up or down by rotation of the nut 89 and thereby causes the release members 54 to move up or down and the jaws 51 to engage or disengage the fuel-element head 48.

As shown in Figs. 9 and 12, the sensing element 55 is attached to the lower end of a rod 94a which extends through the internal tube 73 and has its upper end lying within the casing 86 and attached to a piston 94b. This piston and a cylinder 94c which slidably houses the piston constitute the hydraulic actuator 88. In the event the sensing element 55 becomes stuck, it can be moved up or down by hydraulic fluid supplied through lines 94d and 94e to one side or the other of the piston 94b. Normally the pressure of a spring 94f, acting against the piston 94b, will be sufficient to act with gravity in forcing the sensing element 55 down as the gripping mechanism 20 is moved upward away from a fuel element 21. As the gripping mechanism 20 moves down into engagement with a fuel-element head 48 as shown in Fig. 8, the sensing element moves up, compressing the spring 94f. It is intended that the sensing element 55 indicate by its position whether a fuel-element head 48 is in the gripping mechanism 20. Indicating means (not shown) for this purpose may be connected with the upper end of the rod 94a which projects from the top of the cylinder 94c.

As shown in Fig. 7, the gripping mechanism 20 extends through an opening 95 in the plug 26 when the gripping mechanism is positioned to engage the rod 47 in a fuel element 21 to be removed from the reactor 22. At this time the plug 26 is shifted down out of the cover 25 so that a tubular extension 96 on the plug 26 which is coaxial with the gripping mechanism 20 holds down those fixed elements 21 that directly surround the fuel element to be removed so as to insure that this fuel element will not carry along the fuel elements around it as it is being removed. The plug 26 is carried by the lower end of a rod 97 which projects upwardly through the elliptical plug 76a and a sleeve 98 secured to the top thereof and has at its upper end a threaded portion 99, which is engaged through balls (not shown) by a nut (not shown) rotated by a motor 100. The nut and the motor 100 are carried by the sleeve 98. The rod 97 is held against rotation with respect to the sleeve 98, so that, when the nut is rotated by the motor 100, the rod 97 and plug 26 are moved up or down.

The fuel elements 21 are shifted from the gripping mechanism 20 to the storage container by means of a transfer mechanism 101, which is illustrated in detail in Figs. 3–6. The transfer mechanism comprises a vertical member 102 mounted for angular movement in the slab 30, a horizontal member 103 connected to the lower end of the vertical member 102 so as to swing angularly with angular movement of the vertical member about its own axis, a socket member 104 secured to the end of the horizontal member 103 remote from the vertical member 102, and a keeper 105 for retaining the rod 47 of the fuel element 21 in the socket member 104. The vertical and horizontal members 102 and 103 take the form of tubular casings that house and slidably mount rods 106 and 107 used to shift the keeper 105 in the socket member 104. The rods 106 and 107 are interconnected by a triangular piece 108 pivotally mounted in a housing 109 which connects the vertical and horizontal members 102 and 103 with one another. A strengthening web 109a is welded to the members 102 and 103.

The fuel-element rod 47 enters the socket member 104 through a flaring opening 110 at one side and is supported therein with its collar 50 resting on a shoulder 111 formed in the opening 110. The keeper 105 is slidably mounted in a passageway 112 in the socket member 104 and has a hook portion 113 which engages the rod 47 directly above the collar 50 thereon to retain the rod positively in the keeper 105. The opening 110 at the shoulder 111 has a width about equal to the smaller dimension of the oblong portion 50b of the rod 47, so that the slot 49 in the head 48 can extend only transversely of the horizontal member 113. When the keeper 105 is retracted, the rod 47 can be disengaged from the socket member 104 by being lifted until its collar 50 is clear of the socket member. The opening 110 in the socket member is so shaped that the rod 47 cannot be moved laterally out of the socket member when the collar 50 is in the opening 110. The keeper 105 is retracted by raising of the rod 106 by means of a lever 113 connected to the upper end of the rod 106 and pivoted on a housing 114 secured to the slab 30. A spring 115 aids raising of the rod 106. The transfer mechanism 101 is angularly shifted by a handle 116 secured to the upper end of the vertical member 102 and carries a latch 117 engageable with notches in an extension 118 of the housing 114. A bellows seal 119 is connected between the horizontal member 103 and the outer end of the rod 107. A bellows seal 120 is connected between the housing 114 and an upper portion of the vertical member 102.

The storage container 23 is vertically shifted by a rod 121 carrying it, so as to be capable of lifting a fuel element 21 out of the socket member 104. The rod 121 is also rotatable so as to rotate the container 23 for enabling an entire circle of pockets formed therein to receive a fuel element 21 from the socket member 104. The means for rotating and axially shifting the rod 121 are not shown, but it is to be understood that these means may be similar to those employed for rotating and axially shifting the gripping mechanism 20. These means will preferably be located above a shielding roof 122 for a removal chamber 123. The rod 121 extends through a plug 124 in the slab 30 and a plug 125 in the roof 122. The plugs 124 and 125 have normally plugged openings 126 and 127 through which a tool (not shown) can be inserted from the outside of the roof 122 for pulling a used fuel element 21 through the opening 126 into the removal chamber 123, where it may be swung to a horizontal position and removed by means (not shown). A bellows seal 128 is connected between the chamber 123 and the region of the slab 30 around the plug 124.

When the fuel elements 21 are to be removed from the reactor 22, the control rods for the reactor are fully inserted, and the reactor is shut down. Neither the control rods nor the lifting mechanisms for moving them upwardly out of the reactor are shown, but the control rods may occupy a central region 129 shown dotted in Fig. 2. After the control rods are fully inserted, the lifting mechanisms, which may be similar to the lifting mechanism 20 and will extend through the inner plug 35 in and around the region 129, are raised sufficiently to clear the top of the reactor shield 27. Next the cover 25 is raised to the dotted position of Fig. 1.

Now the plug 35 and/or the plug 40 are rotated to align the gripping mechanism 20 with a fuel element 21 to be removed from the reactor 22. Next, as shown in Figs. 1 and 9, the rod 97 and plug 26 are lowered until the tubular extension 96 engages the fuel elements directly around the one to be removed. As shown in Figs. 1 and 8, the gripping mechanism 20 is rotated by rotation of the sleeve 78 with respect to the sleeve 77 to position the transverse element 59 for entering the slot 49 in the head 48 of the fuel element. The gripping mechanism is lowered until the element 59 enters the slot 49 and the jaws 51 hook under the head 48, the release member 54 being suitably moved up and down to manipulate the jaws 51.

Now the gripping mechanism 20 and the fuel element 21 gripped thereby are raised until the collar 50 on the fuel-element rod 47 is a little above the shoulder 111 in the socket member 104 of the transfer mechanism 101. Next the plugs 35 and 40 and the sleeve 78 are rotated to make the fuel-element rod enter the opening 110 in the socket member 104, as shown in Figs. 5 and 6. Now the fuel element 21 is lowered until the collar 50 engages the shoulder 111. Next the keeper 105 is moved to the position of Fig. 5, in which the fuel-element rod 47 is locked against accidental disengagement. Now the transfer mechanism 101 is rotated until the fuel element 21 carried thereby is in the storage container 23 in alignment with one of a circular series of openings therein adapted to receive the fuel element. Next the container 23 is raised until the fuel element enters the said opening therein and is supported at its lower end by the bottom of said opening in the container. Now the keeper 105 is retracted, and the container 23 and fuel element 21 are raised a small amount so that the collar 50 on the fuel-element rod 47 moves upwardly out of the opening 110 in the socket member 104. At this time the transfer mechanism can be rotated away from the container 23.

The aforesaid operations are repeated for as many fuel elements 21 as are to be placed in the container 23.

The operations are generally reversed for taking a new fuel element 21 from the container 23 to the transfer mechanism 101, the gripping mechanism 20, and the reactor 22. The transverse locating element 59 in the cage 52 and the transverse slot 49 in the head 48 on the fuel-element rod 47 give positive assurance that the new fuel element is in the proper position of rotation for the hexagonal exterior on the fuel element to fit in the hexagonal space formed between the fuel elements that are to surround the new fuel element in the reactor 22. The new fuel elements will be previously brought from the removal chamber to the storage container 23 through the opening 126 in the plug 124 by means (not shown) applied through the opening 127 in the plug 125.

In the event of misalignment between the gripping mechanism 20 and the opening in the reactor 22 where the gripping mechanism is inserting a new fuel element, the cage 52 will assure release of the head 48 on the fuel element from the jaws 51, because, as the jaws 51 move outward, the head 48 can laterally follow one jaw or the other only as far as the inner surface 61 of the cage 52 while the jaw frees itself of the head 48 by withdrawing through the slot 63. The conical skirt 62 of the cage 52 eases the head 48 on the misaligned fuel element into or out of the cage 52.

It is also understood that the invention is not to be limited by the details given herein but that it may be modified within the scope of the appended claims.

What is claimed is:

1. In a handling device for handling a vertically disposed rod shaped element by gripping an enlarged head on the upper end of said element, the enlarged head having a transverse open slot in the upper endmost portion and a circumferential shoulder downwardly thereof, the handling device comprising a vertically movable and vertically disposed tubular member supporting at its lower end a gripping means comprised of pivoted jaws, jaw actuating means and a guide member adjacent said gripping means for guiding the head of the rod into position within the device, means for detecting the presence of the head of the rod in the device in position to be gripped by the jaws comprising a horizontal bar member within the upper portion of the guide member adapted to engage in the slot in said head, means for rotating the gripping means to align said bar with said slot to permit entry of the bar into the slot, a sensing element having the shape of an elongated rod extending coaxially through the tubular member and into the guide member, said sensing element being movable between positions of maximum displacement in the upward and downward directions and having on its lower end adjacent the gripper a configuration conforming to the upper end of the head for abutting engagement therewith, a vertical slot in the lower end of the sensing element accommodating the bar member for permitting the sensing element to move in a vertical direction with respect to said bar member, resilient means on the upper end of the sensing element for urging the sensing element downwardly, slot means adjacent the lower end of the device to permit limited vertical reciprocal movement of the sensing element with respect to the device so that the head end of the rod when in position for engagement by the jaws forces the sensing element against the action of the resilient means to its position of maximum displacement in the upward direction, the resilient means forcing the sensing element to its position of maximum displacement in the downward direction when no rod is in position for engagement by the jaws, the presence or absence of a rod in the device being readily detectable from the vertical position of the upper end of the sensing element.

2. The device of claim 1 wherein the gripping means includes a collar member on the lower end of the tubular supporting member having a central bore to accommodate reciprocal motion of the sensing element therethrough and a pair of depending ears, a horizontal pivot pin supported at its ends in said ears and pivotally supporting the gripping jaws between the ears, and the slot means to permit limited vertical reciprocal movement of the sensing element comprises a second vertical slot near the lower end of the sensing element through which the pivot pin extends just above said first recited vertical slot, said second slot cooperating with said pivot pin to provide a lost motion means between the sensing element and the gripper wherein the upper and lower ends of said second slot limit the travel of the sensing element.

3. The device of claim 1 including a hydraulic actuator for the sensing element comprising a piston on the sensing element adjacent to the upper end thereof, a cylinder slidably receiving the piston and through which the sensing element extends, the cylinder ends sealingly engaging the sensing element, and hydraulic fluid lines connected to the cylinder on both sides of the piston for supplying fluid pressure to actuate the piston in both directions, said resilient means being a coil spring compressed between the upper end of the piston and the upper end of the cylinder.

References Cited in the file of this patent

UNITED STATES PATENTS

| | | |
|---|---|---|
| 2,266,873 | Lang | Dec. 23, 1941 |
| 2,348,563 | Otis | May 9, 1944 |
| 2,397,554 | Lontz | Apr. 2, 1946 |
| 2,492,813 | Osmun | Dec. 27, 1949 |
| 2,794,670 | Menegus et al. | June 4, 1957 |